(12) United States Patent
Matsushima

(10) Patent No.: US 11,496,643 B2
(45) Date of Patent: Nov. 8, 2022

(54) INFORMATION PROCESSING APPARATUS AND CONTROL METHOD FOR DETERMINING WHETHER TO LIMIT PROCESSING BASED ON SWITCH INFORMATION

(71) Applicant: CANON KABUSHIKI KAISHA, Tokyo (JP)

(72) Inventor: Hiroki Matsushima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/153,395

(22) Filed: Jan. 20, 2021

(65) Prior Publication Data

US 2021/0243324 A1 Aug. 5, 2021

(30) Foreign Application Priority Data

Jan. 31, 2020 (JP) .............................. JP2020-014903

(51) Int. Cl.
*H04N 1/00* (2006.01)
*H02J 9/06* (2006.01)

(52) U.S. Cl.
CPC ......... *H04N 1/00901* (2013.01); *H02J 9/062* (2013.01); *H04N 1/00891* (2013.01)

(58) Field of Classification Search
None
See application file for complete search history.

(56) References Cited

U.S. PATENT DOCUMENTS

2014/0029043 A1* 1/2014 Nagami ............. H04N 1/00888
358/1.14
2015/0195417 A1* 7/2015 Ohhashi ............. H04N 1/00896
358/1.14

FOREIGN PATENT DOCUMENTS

JP 2010-129042 A 6/2010

* cited by examiner

*Primary Examiner* — Lennin R Rodriguezgonzalez
(74) *Attorney, Agent, or Firm* — Canon U.S.A., Inc. IP Division

(57) ABSTRACT

To provide an apparatus for performing operation relating to switching of a power switch while power is supplied from an auxiliary power source, the apparatus acquires switch information indicating whether the power switch is in an on state from a BMU of a battery pack and determines whether to limit processing based on a user instruction based on the acquired switch information.

20 Claims, 6 Drawing Sheets

INFORMATION PROCESSING APPARATUS AND CONTROL METHOD FOR DETERMINING WHETHER TO LIMIT PROCESSING BASED ON SWITCH INFORMATION

BACKGROUND OF THE DISCLOSURE

Field of the Disclosure

The aspect of the embodiments relates to an information processing apparatus operable from a rechargeable auxiliary power source.

Description of the Related Art

Some information processing apparatus are operable from an auxiliary power source such as a battery in a case where an AC adapter is not connected. Japanese Patent Laid-Open No. 2010-129042 discloses an apparatus wherein a power source is switched from an external power source to an auxiliary power source in a case where a power switch is turned off while data is input from a different apparatus.

In a state where the auxiliary power source is used, there is a possibility of noise and a malfunction of the apparatus as compared with a state where an AC adapter is used as a power source. However, Japanese Patent Laid-Open No. 2010-129042 neither focuses on a false detection of switching of the power switch nor discloses a method of reducing the false detection. In such a situation, in the case of a false detection of switching of the power switch caused by noise or a malfunction of the apparatus, control relating to the switching cannot be appropriately performed.

SUMMARY OF THE DISCLOSURE

In a first aspect of the embodiments, there is provided an apparatus for receiving power supply from a power source, the apparatus comprising an acquisition unit configured to acquire switch information indicating whether a power switch is in an on state from a storage unit provided in the power source; and a determination unit configured to make a determination whether to limit processing based on a user instruction based on the acquired switch information.

In a second aspect of the embodiments, there is provided method of controlling an apparatus for receiving power supply from a power source, the method comprising: acquiring switch information indicating whether a power switch is in an on state from a storage unit provided in the power source; and executing determination processing of determining whether to limit processing based on a user instruction based on the acquired switch information.

Further features of the disclosure will become apparent from the following description of exemplary embodiments with reference to the attached drawings.

DESCRIPTION OF THE EMBODIMENTS

First Embodiment

Figure 1:
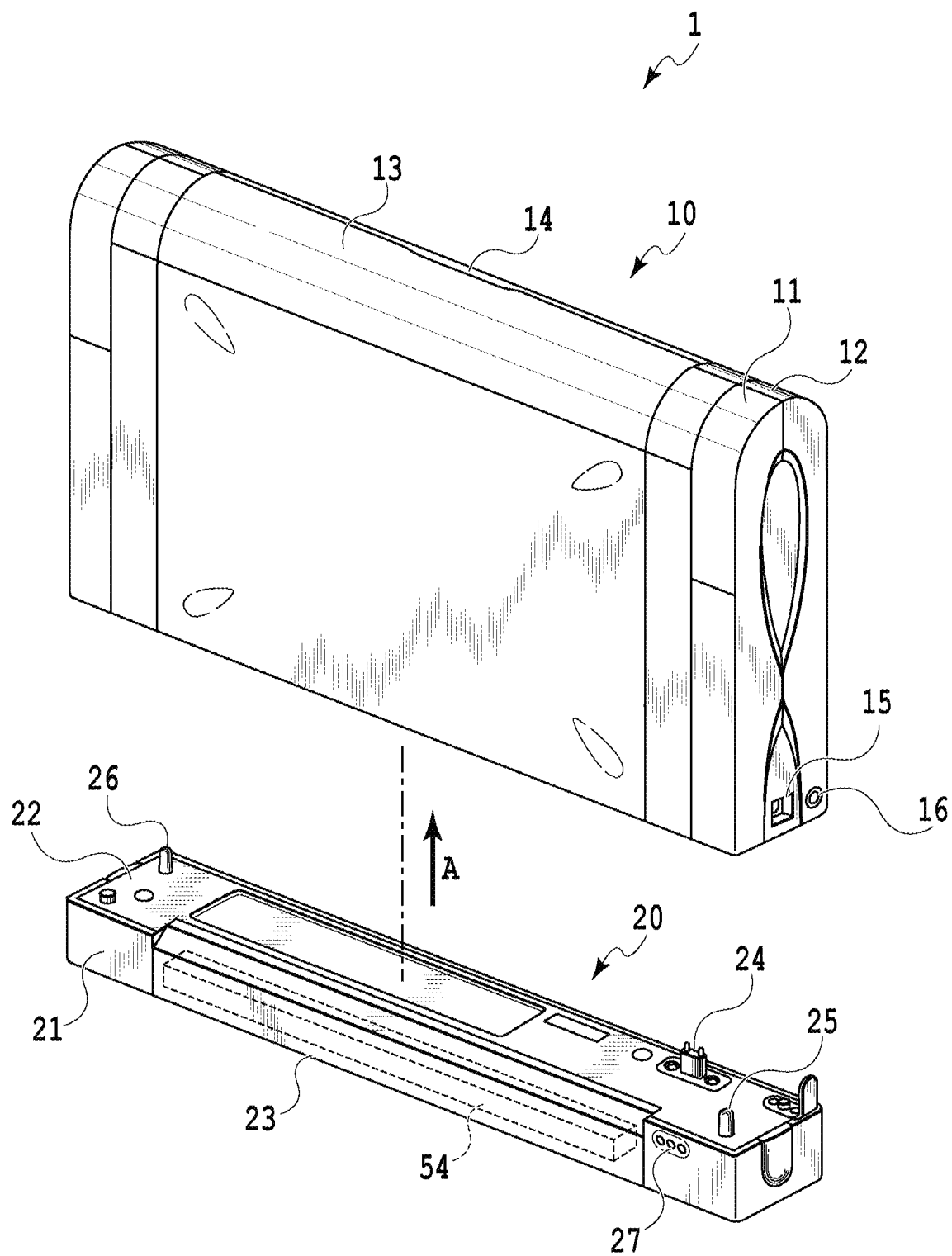
FIG. 1 is an external perspective view of a printer.

FIG. 1 is an external perspective view of a portable inkjet printer 1 (hereinafter simply referred to as "printer" or "image printing apparatus") applicable as an information processing apparatus of the present embodiment. The printer 1 includes a printer body 10 and a battery module 20 as an auxiliary power source of the printer body 10.

The printer body 10 has an integral shell structure formed by an upper case 11, a lower case 12, a sheet feed cover 13, and a sheet ejecting port cover 14. The printer body 10 can be placed upright as shown in FIG. 1 in a case where it is not used as the printer 1, for example, in a case where it is stationary or is carried.

The sheet feed cover 13 can be removed from the printer body 10 to become a sheet feeding tray for feeding a sheet of paper or the like to a printing unit at the time of printing. The sheet ejecting port cover 14 can be removed from the printer body 10 to become a sheet ejecting tray for ejecting a printed sheet at the time of printing.

The side surface of the printer body 10 is equipped with an interface (I/F) connector 15 and a DC in jack 16 for direct-current power source input. The I/F connector 15 is a connector for connecting a USB cable. The DC in jack 16 is a socket for an AC adapter cable used to receive power supply from an AC power source. Although not shown in FIG. 1, the side surface of the printer body 10 is also equipped with an operation unit operable by a user such as a power switch 80 (see FIG. 3). In the present embodiment, the AC power source is also referred to as an external power source.

The battery module 20 includes a main case 21, a cover case 22, and a battery lid 23. The main case 21 can accommodate a battery pack 54 with a built-in rechargeable battery (such as a lithium-ion battery). The battery pack 54 can be attached to and detached from the main case 21 through an opening formed by removing the battery lid 23.

The battery module 20 can be detachably connected to the printer body 10 in the direction of arrow A in FIG. 1. A surface of the battery module 20 to be connected to the printer body 10 is equipped with a body connector 24 for electrical connection to the printer body 10 and fixing bosses 25 and 26 for mechanical connection to the printer body 10.

The battery pack 54 is recharged and the printer body 10 is powered by the battery pack 54 while the battery module 20 is connected to the printer body 10. The battery pack 54 is recharged from the AC power source via the DC in jack 16 and the body connector 24. The top surface of the battery module 20 is equipped with a charge indicator 27 indicating a battery charge state.

Figure 2:
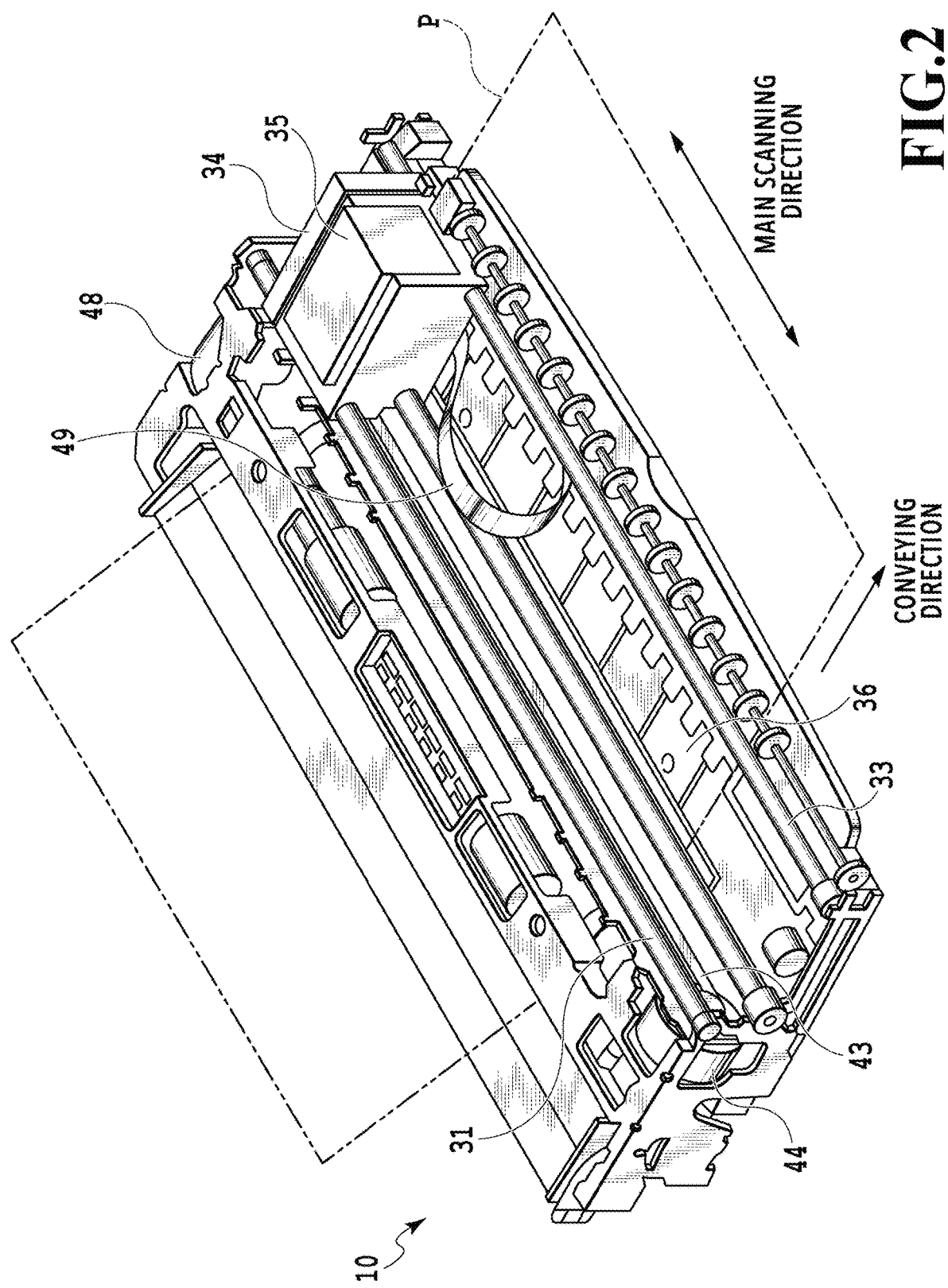
FIG. 2 is a diagram showing a printer body in print operation.

FIG. 2 shows the printer body 10 in print operation. In the case of performing print operation, the sheet feed cover 13 and the sheet ejecting port cover 14 are removed from the printer body 10. The printer body 10 may be laid flat as shown in the drawing or may be placed upright.

The printer body 10 includes a conveying roller 31, a guide rail 33, a carriage 34, a cartridge 35, a carriage belt 43, a carriage motor 44, a conveying motor 48, a flexible cable 49, and a platen 36.

The conveying roller 31 is driven by the conveying motor 48 and conveys a sheet P in the conveying direction in the drawing. The carriage 34 is driven by the carriage motor 44 and reciprocates along the guide rail 33 in the main scanning direction in the drawing. In the cartridge 35 mounted on the carriage 34, an ink tank storing ink and a print head capable of ejecting ink supplied from the ink tank are integrally formed. The print head ejects ink in accordance with print data while the carriage 34 moves in the main scanning direction, whereby an image corresponding to one band is printed on a sheet P supported by the platen 36. An image is gradually printed on the sheet P by alternately repeating print scan corresponding to one band and conveying operation of a length corresponding to one band. At this time, the print data is supplied to the print head via the flexible cable 49 capable of following the movement of the carriage 34.

Although the ink tank and the print head are integrally formed in the cartridge 35 here, the ink tank and the print head may be removable from each other.

Figure 3:
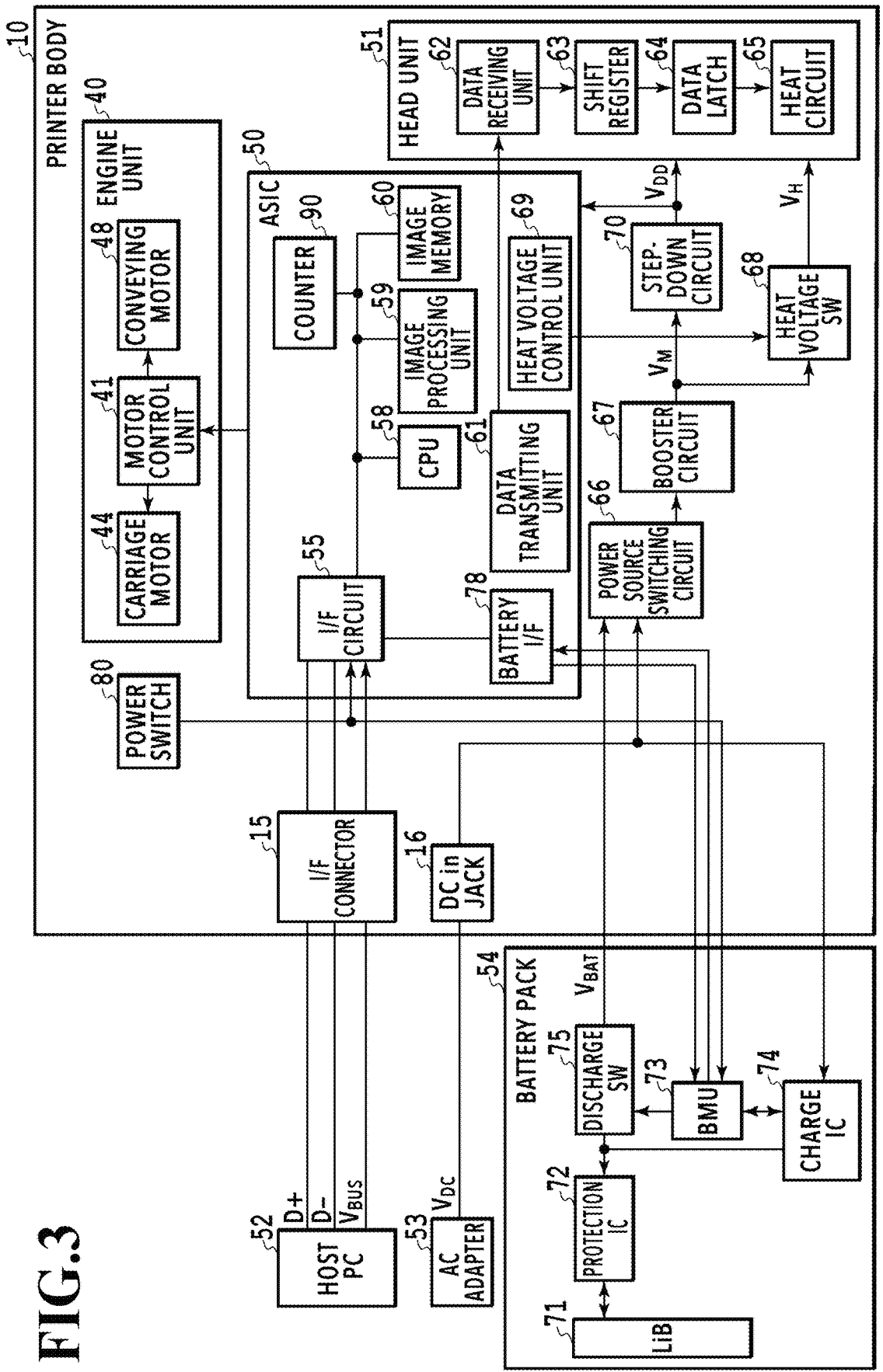
FIG. 3 is a block diagram showing a control configuration of a printer in a first embodiment.

FIG. 3 is a block diagram showing a control configuration of the printer 1 in the present embodiment. An application-specific integrated circuit (ASIC) 50 controls all kinds of operation relating to the printer body 10 such as print operation and switching of power to be supplied to the apparatus. A head unit 51 controls driving of the print head under instructions from the ASIC 50. An engine unit 40 controls movement of the carriage 34 and conveyance of a sheet P under instructions from the ASIC 50.

Image data and a control command generated in a host PC 52 for printing in the printer 1 are supplied to the ASIC 50 via the I/F connector 15. In the present embodiment, a command including image data and a control command is referred to as a printer command A CPU 58 of the ASIC 50 analyzes the image data and control command received via the I/F circuit 55. An image processing unit 59 performs predetermined image processing for image data based on the result of analysis by the CPU 58. Print data is generated by performing the image processing for the image data and stored in an image memory 60. A data transmitting unit 61 transmits the print data stored in the image memory 60 to the head unit 51 under instructions from the CPU 58.

In the head unit 51, the print data is received by a data receiving unit 62, converted from serial data to parallel data by a shift register 63, temporarily stored in a data latch 64, and transferred to a heat circuit 65. The heat circuit 65 drives the print head using a drive voltage $V_H$ supplied from a heat voltage SW 68 based on print data received from the data latch 64 and control data such as a voltage application time, whereby ink is ejected from the print head.

On the other hand, a motor control unit 41 of the engine unit 40 drives the carriage motor 44 such that the carriage 34 moves in accordance with the ejection operation of the print head described above. After one print scan is finished, the conveying motor 48 is driven to convey a sheet P by a predetermined amount.

The battery pack 54 includes a lithium-ion battery (LiB) 71 as a power source, a protection IC 72, a battery management unit (BMU) 73 as a control unit, a charge IC 74 and a discharge SW 75. In a case where an AC adapter 53 is connected to the printer body 10, the battery pack 54 can recharge the LiB 71 from the AC adapter 53. In a case where the AC adapter 53 is not connected to the printer body 10, the battery pack 54 can discharge power accumulated in the LiB 71 and supply it to the printer body 10.

In the battery pack 54, the protection IC 72 is an IC having the function of protecting the LiB 71 from abnormal operation such as overdischarge, overcharge, or overcurrent. The BMU 73 performs control such as a discharge or charge of the LiB 71 at a command from the ASIC 50. At this time, the ASIC 50 communicates with the BMU 73 via a battery I/F 78 in the ASIC 50. In the present embodiment, a universal asynchronous receiver transmitter (UART) system is used as a communication system. In the case of recharging, the charge IC 74 supplies a charging current from the AC adapter 53 to the LiB 71 and performs on/off control of the charging current in accordance with an instruction from the BMU 73. In a case where the BMU 73 instructs the charge IC 74 to turn on the charging current, the charging current is supplied from the AC adapter 53 to the LiB 71. On the other hand, in a case where the BMU 73 instructs the charge IC 74 to turn off the charging current, the charging current is stopped from being supplied from the AC adapter 53 to the LiB 71.

An example of timings of on/off control of the charging current will be described below. For example, in a case where the printer body performs print operation, the BMU 73 sets the charge IC 74 to turn off the charging current. On the other hand, in a case where the printer body does not perform print operation, the BMU 73 sets the charge IC 74 to turn on the charging current.

In the case of discharging, the discharge SW 75 performs on/off control of a discharging current from the LiB 71 in accordance with an instruction from the BMU 73. In a case where the discharge SW is turned on at an instruction from the BMU 73, the power stored in the LiB 71 is discharged. That is, the power stored in the LiB 71 is supplied to the printer body 10 via the discharge SW 75. On the other hand, in a case where the discharge SW is turned off at an instruction from the BMU 73, the power stored in the LiB 71 is stopped from being discharged. That is, the power stored in the LiB 71 is stopped from being supplied to the printer body 10.

An example of timings of on/off control of the discharging current will be described below. For example, in a case where the printer body performs print operation, the BMU 73 sets the discharge SW 75 to turn on the discharging current. For example, in a case where the state of the printer body is transitioned to a system activation state to be described later, the BMU 73 sets the discharge SW 75 to turn on the discharging current. On the other hand, in a case where the power switch of the printer body is turned off, the BMU 73 sets the discharge SW 75 to turn off the discharging current. For example, in a case where the system of the printer body is shut down, the BMU 73 sets the discharge SW 75 to turn off the discharging current.

The printer 1 of the present application can be operated by either power (output voltage $V_{DC}$) supplied from the AC adapter 53 via the DC in jack 16 or power (output voltage $V_{BAT}$) supplied from the battery pack 54. The power source switching circuit 66 is a circuit for selectively switching between these power sources. In a case where both the AC adapter 53 and the battery pack 54 are connected, the power source switching circuit 66 supplies a current to a booster circuit 67 at the voltage $V_{DC}$ obtained from the AC adapter 53. On the other hand, in a case where the AC adapter 53 is not connected and the battery pack 54 is connected, the power source switching circuit 66 supplies a current to the booster circuit 67 at the voltage $V_{BAT}$ obtained from the battery pack 54. A counter 90 counts a time during which the battery pack 54 is used as the power source.

The booster circuit 67 boosts the voltage obtained from the power source switching circuit 66 to a voltage $V_M$ suitable for driving the head unit 51. The heat voltage SW 68 switches between on and off states (application and non-application states) of the voltage $V_M$ obtained from the booster circuit 67 in accordance with an instruction from the heat voltage control unit 69 and supplies a current at the drive voltage $V_H$ to the head unit 51. In contrast, a step-down circuit 70 steps down the voltage $V_M$ obtained from the booster circuit 67 to a control voltage $V_{DD}$ suitable for logic control of the ASIC 50 and the head unit 51 and supplies the stepped-down current to the ASIC 50 and the head unit 51.

The power switch 80 is a tactile switch for accepting a user instruction to activate (on) and shut down (off) the printer 1. In a case where a user presses the power switch 80, an electrical signal is issued and transmitted to the ASIC 50 and the battery pack 54. Each of the CPU 58 of the ASIC 50 and the BMU 73 of the battery pack 54 has a storage unit configurable by a RAM, ROM, register or the like to store updatable information about whether the power switch 80 is in the on state or the off state. The ASIC 50 can recognize whether the printer 1 is in the on state or the off state by detecting the information of the storage unit. The storage unit provided in the CPU 58 is also referred to as a body storage unit so as to be distinguished from the other storage unit. For example, in a case where the power switch 80 of the printer body is in the off state, the storage units store information indicating the off state. In a case where a user operates the power switch 80 in this situation, the CPU 58 and the BMU 73 receive an electrical signal in a low state having a voltage value lower than a predetermined value. In a case where this electrical signal is received, the CPU 58 and the BMU 73 update information indicating the off state stored in the storage units to information indicating the on state. In a case where a user operates the power switch 80 while the storage units store information indicating the on state, the CPU 58 and the BMU 73 receive an electrical signal in a low state having a voltage value lower than a predetermined value. In a case where this electrical signal is received, the CPU 58 and the BMU 73 update information indicating the on state stored in the storage units to information indicating the off state.

Figure 4:
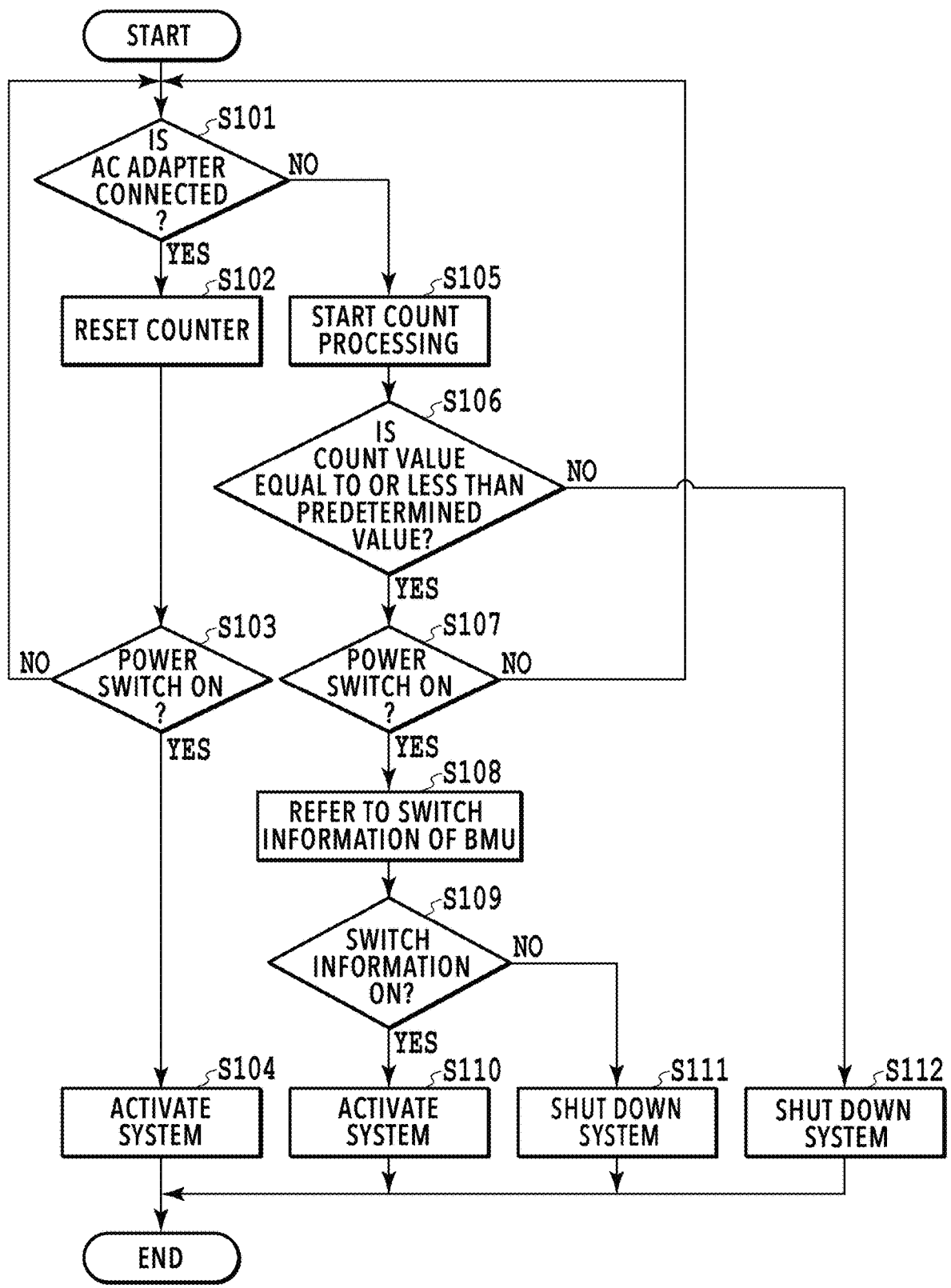
FIG. 4 is a flowchart illustrating control processing in the first embodiment.

FIG. 4 is a flowchart illustrating a procedure executed by the CPU 58 of the ASIC 50 in a case where power is supplied to the printer body 10. If the processing is started, the CPU 58 first determines in S101 whether the AC adapter 53 is connected to the DC in jack 16. For example, in a case where the AC adapter 53 is connected, a current supplied from the AC adapter 53 is detected in the printer body 10 and a detection signal is generated. If the CPU 58 receives the detection signal, the CPU 58 determines Yes in S101. If the CPU 58 does not receive the detection signal, the CPU 58 determines No in S101.

If the CPU 58 determines that the AC adapter 53 is connected, the CPU 58 resets the counter 90 (S102). Further, the CPU 58 determines in S103 whether the power switch 80 is turned on. The steps S101 to S103 are repeated while the AC adapter 53 is connected and the power switch 80 is in the off state.

If the CPU 58 determines in S103 that the power switch 80 is in the on state, the CPU 58 proceeds to S104 and transitions the state of the printer body 10 to a system activation state using the AC adapter 53 as the power source. The system activation state means a state where the printer body 10 can start operation as the printer 1 upon receipt of a print command from the host PC 52 and accept user operation from an unshown operation unit or the like. In other words, the system activation state is a state where processing can be executed based on a user instruction.

If the CPU 58 determines in S101 that the AC adapter 53 is not connected to the DC in jack 16, the CPU 58 proceeds to S105 and starts count processing using the counter 90.

In S106, the CPU 58 determines whether a count value of the counter 90 is equal to or less than a predetermined value. If the count value is equal to or less than the predetermined value, the CPU 58 proceeds to S107 and determines whether the power switch 80 is turned on.

If the CPU 58 determines that the power switch 80 is turned on in S107, the CPU 58 proceeds to S108 and refers to and acquires switch information stored in the BMU 73 of the battery pack 54, the switch information indicating whether the power switch 80 is in the on state or the off state. In S109, the CPU 58 further determines whether the switch information acquired in S108 indicates the on state. If the CPU 58 determines that the switch information indicates the on state, the CPU 58 proceeds to S110, transitions the state of the printer body 10 to the system activation state, and finishes the processing. If the CPU 58 determines that the switch information indicates the off state, the CPU 58 proceeds to S111 and shuts down the system of the printer body 10. In a case where the system is shut down in the present embodiment, the CPU 58 does not accept a user instruction except for user operation of the power switch 80. For example, in the state where the system is shut down, the printer body 10 does not receive a print command from the host PC 52 (or does not execute processing based on a print command) Further, in the state where the system is shut down, the printer body 10 does not accept user operation from the operation unit (or does not display a screen on the operation unit). That is, the state where the system is shut down corresponds to a state where a user instruction is not accepted except for user operation of the power switch 80, and thus can be said to be a state where processing based on a user instruction is limited for example.

The processing of FIG. 4 proceeding to S109 means that turn-on of the power switch 80 is detected in S107. However, the CPU 58 cannot monitor an electrical signal transmitted from the power switch 80 at the activation immediately after power is supplied. That is, the CPU 58 has a possibility of a false detection of turn-on/turn-off of the power switch 80 at the activation immediately after power is supplied. On the other hand, the BMU 73 is regularly operated all the time by power supplied from the LiB 71. Thus, the BMU 73 can correctly detect turn-on/turn-off of the power switch 80. Accordingly, by rechecking the switch information of the BMU 73 in S109, the CPU 58 can correctly determine the on/off state of the power switch and more appropriately perform system control.

If the CPU 58 determines in S106 that the count value of the counter 90 is greater than the predetermined value, the CPU 58 proceeds to S112 and shuts down the system of the printer body 10. The predetermined value to be compared with the count value is a length of a period during which power can be supplied from the battery pack 54 without connection to the AC adapter 53 and can be set at a value such as three or six minutes. This control can prevent a situation in which the use of the battery pack 54 as the power source continues longer than necessary and the charge amount of the battery pack 54 decreases.

In the case of shutting down the system in S111 or S112, the CPU 58 transmits shutdown information on the system to the BMU 73 of the battery pack 54 via the battery I/F 78. Upon receipt of the shutdown information, the BMU 73 controls the discharge SW 75 to stop supplying the power $V_{BAT}$ from the LiB 71. The processing is thus finished.

In the processing of FIG. 4, S108 is performed in a case where the determination in S107 is Yes. Since S107 is performed before S108, the CPU 58 refers to the switch information of the BMU 73 if necessary. This leads to a reduction in waste of power of the LiB 71 caused by unnecessarily performing S108. However, the determination in S107 may be omitted and S108 may be executed subsequently to S106.

In the above description, the count value of the counter is a time during which the power from the battery pack 54 is consumed. However, for example, the count value may be the number of times that the steps S101 and S105 to S107 are repeated. In this case, the predetermined value to be compared with the count value in S106 may be set at the number of times such as five or ten. Either will do as long as it is possible to obtain information about a time during which the power from the battery pack 54 is consumed.

As described above, according to the present embodiment, appropriate system control can be performed by referring to the switch information stored in the BMU 73 of the battery pack 54. Further, providing the storage units removes the necessity of a latched circuit or the like in the printer body 10, which enables a reduction in cost and circuit board area in the printer body 10.

Second Embodiment

The printer 1 described with reference to FIG. 1 and FIG. 2 is also used in the present embodiment like the first embodiment. However, the battery pack 54 of the present embodiment can be recharged from the AC power source via the DC in jack 16 or recharged by bus power from a USB connected to the host PC 52 via the I/F connector 15. In the present embodiment, the AC power source and the host PC 52 are also referred to as external power sources.

Figure 5:
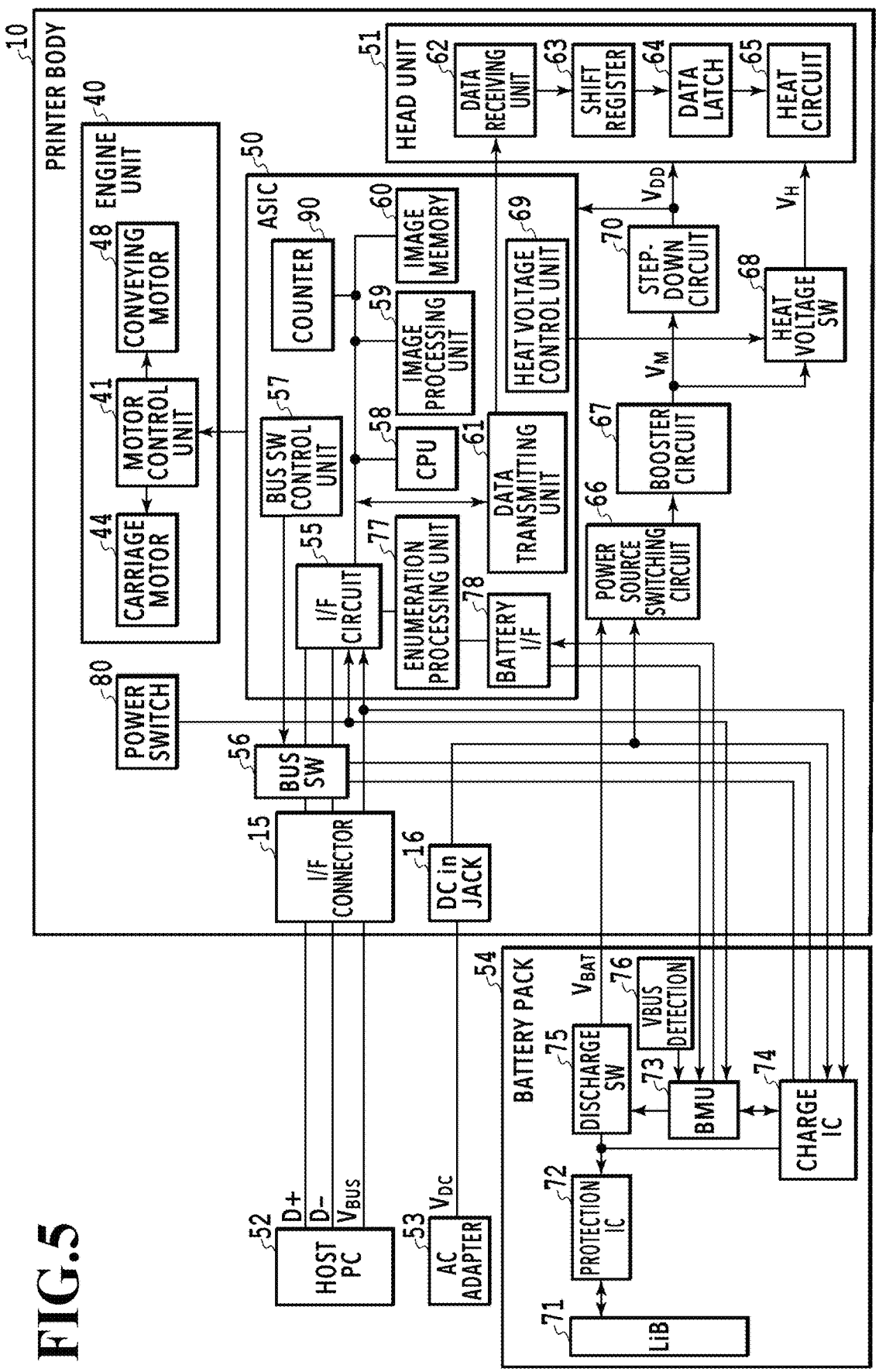
FIG. 5 is a block diagram showing a control configuration of a printer in a second embodiment.

FIG. 5 is a block diagram showing a control configuration of the printer 1 in the present embodiment. A description will be given of a difference between the present embodiment and the first embodiment described with reference to FIG. 3. Image data and a control command generated by the host PC 52 for printing in the printer 1 are supplied to the ASIC 50 via the I/F connector 15 and a bus SW 56. The bus SW 56 can set either the ASIC 50 or the battery pack 54 as a connection destination of D+ and D− pins of the USB in accordance with an instruction from a bus SW control unit 57 in the ASIC 50. In a case where the USB is connected to the printer body, the bus SW control unit 57 designates the battery pack 54 as the connection destination of the D+ and D− pins of the USB. After a BCS determination to be described later is finished, the bus SW control unit 57 designates the ASIC 50 as the connection destination of the D+ and D− pins of the USB.

In the battery pack 54, the charge IC 74 of the present embodiment can recharge the LiB 71 from both of the voltage $V_{DC}$ of the AC adapter 53 and a voltage $V_{BUS}$ of the USB. In a case where the D+ and D− pins of the USB are connected to the battery pack 54 by the bus SW 56, the charge IC 74 makes a determination of a charging current according to a supply source host device such as the host PC 52.

At this time, the present embodiment adopts a determination conforming to the USB Battery Charging (USB-BC) Specification (hereinafter referred to as BCS determination). The BCS determination is processing for determining what protocol is used for USB connection between a power supply apparatus (host PC in the present embodiment) and the printing apparatus body 10. There are three types of results of the BCS determination by the charge IC 74: Standard Downstream Port (SDP), Charging Downstream Port (CDP), and Dedicated Charging Port (DCP). If the determination result is SDP, the charge IC 74 permits a charge of 500 mA after the completion of enumeration processing. If the determination result is CDP or DCP, the charge IC 74 permits a charge of 1.5 A. SDP is a protocol used for USB connection between the host PC 52 and the printing apparatus body 10 via a port other than the charge port of the host PC 52. In a case where SDP is used, power corresponding to 100 mA is permitted to be supplied to the printing apparatus body 10 until enumeration processing is completed between the host PC 52 and the printing apparatus body 10. After the completion of the enumeration processing, power corresponding to a current greater than 100 mA (for example, 500 mA) is permitted to be supplied to the printing apparatus body 10. CDP is a protocol used for USB connection between the host PC 52 and the printing apparatus body 10 via the charge port of the host PC 52. In a case where CDP is used, supply of power corresponding to a sufficiently large current (for example, 1.5 A) is permitted before enumeration processing is completed between the host PC 52 and the printing apparatus body 10. DCP is a protocol used for USB connection between a charging apparatus such as a mobile battery and the printing apparatus body 10. In a case where DCP is used, enumeration processing is not performed between the mobile battery and the printing apparatus body 10. Supply of power corresponding to a sufficiently large current (for example, 1.5 A) is permitted without enumeration processing.

The charge IC 74 performs the BCS determination at the time when the bus SW control unit 57 designates the battery pack 54 as the connection destination of the D+ and D− pins of the USB. As described above, after the BCS determination is finished, the bus SW control unit 57 designates the ASIC 50 as the connection destination of the D+ and D− pins of the USB. In a case where the ASIC 50 is designated as the connection destination of the D+ and D− pins of the USB, the CPU 58 requests the result of the BCS determination from the battery pack 54. In response to the request, the result of the BCS determination performed by the charge IC 74 is supplied to the ASIC 50 via the BMU 73 and the battery I/F 78.

A VBUS detection circuit 76 is a circuit for detecting that a host PC or host device is connected to the I/F connector 15 of the printer 1. The VBUS detection circuit 76 supplies the detection result to the BMU 73.

The ASIC 50 is equipped with an enumeration processing unit 77 for performing enumeration processing with the host PC 52 in a case where the host PC 52 is connected. In a case where the result of the BCS determination acquired from the battery pack 54 is SDP or CDP, the ASIC 50 performs enumeration processing. If the determination result is CDP, the ASIC 50 may perform processing for getting the printer body 10 recognized without performing processing for determining a current value. In contrast, in a case where the result of the BCS determination acquired from the battery pack 54 is DCP, the ASIC 50 does not perform enumeration processing. In a case where the result of the BCS determination acquired from the battery pack 54 is DCP, the ASIC 50 may perform processing for getting the printer body 10 recognized without performing processing for determining a current value. The result of the processing by the enumeration processing unit 77 is transmitted to the BMU 73 of the battery pack 54 via the battery I/F 78. The BMU 73 instructs the charge IC 74 to change the charging current based on the received enumeration processing result and BCS determination result. The enumeration processing is performed by the ASIC 50 using power supplied from the battery pack 54 for example.

Figure 6:
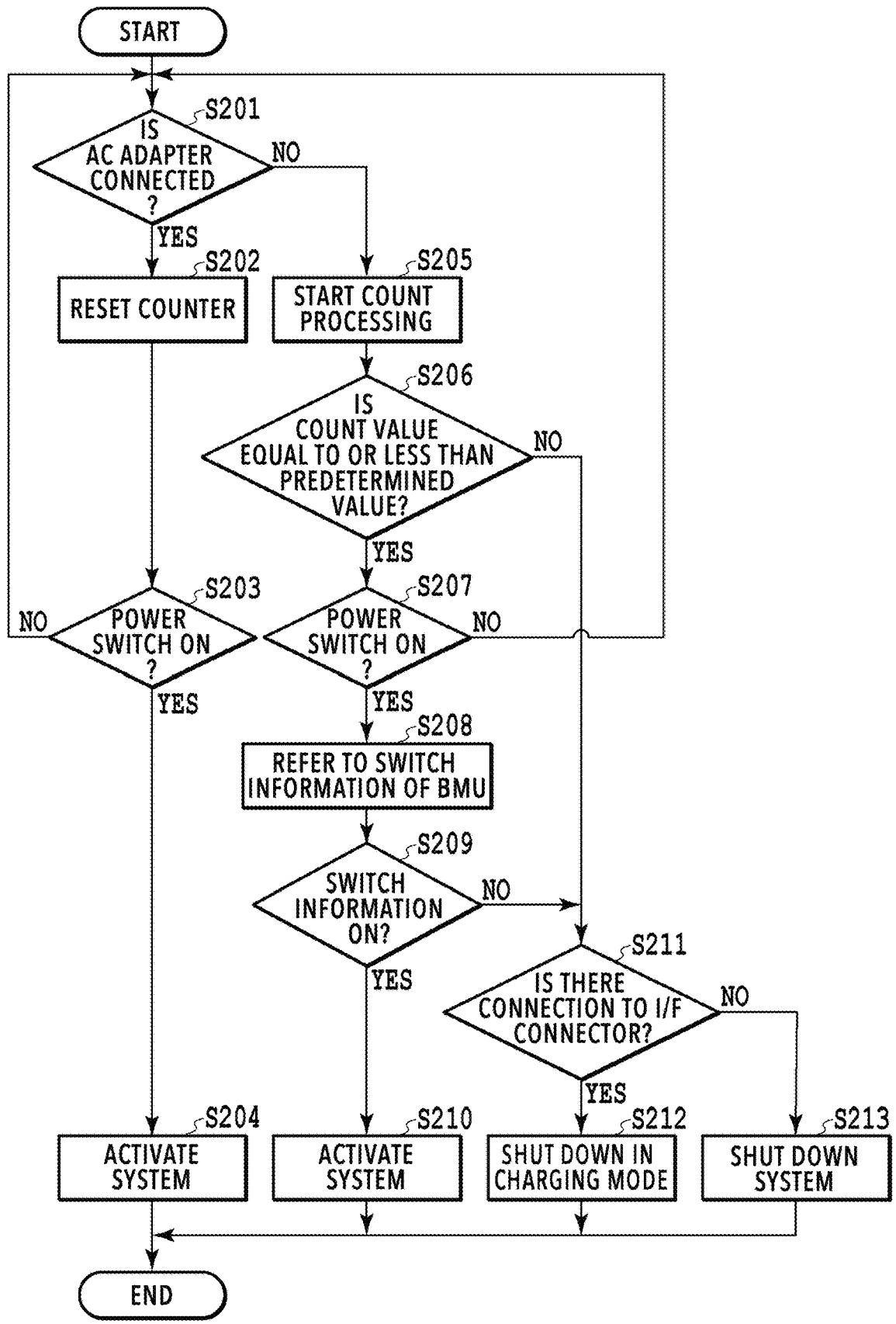
FIG. 6 is a flowchart illustrating control processing in the second embodiment.

FIG. 6 is a flowchart illustrating a procedure executed by the CPU 58 of the present embodiment in a case where power is supplied to the printer body 10. In the flowchart, S201 to S210 are identical to S101 to S110 of FIG. 4 described in the first embodiment. Thus, their description is omitted here. The printer body 10 improves charging efficiency by putting high priority on charging processing without performing printing processing during a bass power charge from the USB connected to the host PC 52 via the I/F connector 15.

If the CPU 58 determines in S206 that the count value of the counter 90 is equal to or less than a predetermined value, or if the CPU 58 determines in S209 that the switch information of the BMU 73 indicates the off state, the CPU 58 proceeds to S211 and determines whether there is connection to the I/F connector 15. If there is connection to the I/F connector 15, the CPU 58 proceeds to S212 and shuts down the system in a charging mode. More specifically, the CPU 58 notifies the BMU 73 of the result of processing by the enumeration processing unit 77 and shuts down the system of the printer body 10 while keeping recharging the battery pack 54 from the power source $V_{BUS}$. The shutdown state in the charging mode indicates a state where the system can be immediately activated even after shutdown in a case where the power switch 80 is turned on or a print command is transmitted from the host PC 52. Also in this state, processing based on a user instruction is limited between the turn-on of the power switch 80 or transmission of a print command from the host PC 52 and the activation. Thus, the shutdown in the charging mode can also be said to be a state where processing based on a user instruction is limited. However, this state is not particularly limited and may be a state where the system is activated at turn-on of the power switch 80 and does not accept a print command. In a case where the system is shut down in the charging mode, the LiB 71 is recharged by the charging current from the host PC via the USB. Since the consumption of power of the LiB 71 by the ASIC 50 is reduced by shutdown in the charging mode, a bas power charge is efficiently executed during shutdown in the charging mode.

If the CPU 58 determines in S211 that there is no connection to the I/F connector 15, the CPU 58 proceeds to S213 and shuts down the system of the printer body 10. This control can prevent a situation in which the use of the battery pack 54 as the power source continues longer than necessary and the charge amount of the battery pack 54 decreases.

In the case of shutting down the system in S112, the CPU 58 transmits shutdown information on the system to the BMU 73 of the battery pack 54 via the battery I/F 78. Upon receipt of the shutdown information, the BMU 73 controls the discharge SW 75 to stop supplying the power $V_{BAT}$ from the LiB 71. The processing is thus finished.

As described above, according to the present embodiment, appropriate system control can be performed even in a case where there is connection to the I/F connector 15 and the enumeration processing is performed.

Other Embodiments

In the embodiments described above, the inkjet printer is described as an example. However, the processing described above may be applied to a printing apparatus of a different system as long as the printing apparatus is operated by power supplied from a battery pack. For example, the processing described above may be performed in an electrophotographic printing apparatus.

In the embodiments described above, the inkjet printer is described as an example. However, the processing described above may be applied to a different apparatus as long as the apparatus is operated by power supplied from a battery pack. For example, the processing described above may be performed in a personal computer, a digital camera, or a scanner.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-014903 filed Jan. 31, 2020, which is hereby incorporated by reference wherein in its entirety.

What is claimed is:

1. An apparatus for receiving power supply from an auxiliary power source, the apparatus comprising:
    at least one processor; and
    a memory coupled to the at least one processor storing instructions that, when executed by the at least one processor, cause the at least processor to function as:
    an acquisition unit configured to acquire switch information indicating whether a power switch is in an on state from a storage unit provided in the auxiliary power source;
    a first determination unit configured to determine whether a first external power source different from the auxiliary power source is connected to the apparatus, and
    a second determination unit configured to make a determination whether to limit processing based on a user instruction based on the acquired switch information in a case where the first determination unit determines that the first external power source different from the auxiliary power source is not connected to the apparatus.

2. The apparatus according to claim 1, wherein the at least one processor further functions as:
    a detection unit configured to detect a press on the power switch; and a control unit configured to operate the apparatus without limitation on processing based on a user instruction in a case where power is supplied from the first external power source different from the auxiliary power source and the power switch is in the on state, wherein the second determination unit makes the determination based on the switch information in a case where power is supplied from the auxiliary power source.

3. The apparatus according to claim 2, wherein the at least one processor further functions as a measurement unit configured to measure a time during which power is supplied from the auxiliary power source, wherein while the detection unit does not detect a press on the power switch, processing based on a user instruction is limited in a case where a value measured by the measurement unit is greater than a predetermined value, and the second determination unit makes the determination based on the switch information in a case where the measured value is equal to or less than the predetermined value.

4. The apparatus according to claim 2, wherein in a case where both of the first external power source and the auxiliary power source are connected, the auxiliary power source is recharged from the first external power source.

5. The apparatus according to claim 2 wherein the first external power source is an AC power source.

6. The apparatus according to claim 2, wherein in a case where the second determination unit determines that processing based on a user instruction is to be limited based on the switch information, the auxiliary power source is recharged from a second external power source after the processing based on the user instruction is limited.

7. The apparatus according to claim 6, wherein the second external power source is a host device connected by a USB to generate image data for execution of printing processing by the apparatus.

8. The apparatus according to claim 1, wherein the auxiliary power source is a lithium-ion battery.

9. The apparatus according to claim 1, wherein the power switch is a tactile switch which issues an electrical signal by being pressed.

10. The apparatus according to claim 1, wherein processing based on a user instruction is limited in a case where the acquired switch information indicates an off state of the power switch.

11. The apparatus according to claim 1, wherein processing based on a user instruction is printing processing based on image data.

12. The apparatus according to claim 1, wherein in a case where a body storage unit of the apparatus stores switch information indicating that the power switch is in the on state, the second determination unit determines whether to limit processing based on a user instruction based on the acquired switch information.

13. The apparatus according to claim 1, further comprising the auxiliary power source.

14. A method of controlling an apparatus for receiving power supply from an auxiliary power source, the method comprising:

acquiring switch information indicating whether a power switch is in an on state from a storage unit provided in the auxiliary power source;

executing first determination processing of determining whether an first external power source different from the auxiliary power source is connected to the apparatus; and executing second determination processing of determining whether to limit processing based on a user instruction based on the acquired switch information in a case where it is determined that the first external power source different from the auxiliary power source is not connected to the apparatus in the first determination processing.

15. The method according to claim 14, further comprising:

detecting a press on the power switch; and operating the apparatus without limitation on processing based on a user instruction in a case where power is supplied from a first external power source different from the auxiliary power source and the power switch is in the on state, wherein the second determination processing is performed based on the switch information in a case where power is supplied from the auxiliary power source.

16. The method according to claim 15, further comprising measuring a time during which power is supplied from the auxiliary power source, wherein while a press on the power switch is not detected, processing based on a user instruction is limited in a case where the measured value is greater than a predetermined value, and the second determination processing is performed based on the switch information in a case where the measured value is equal to or less than the predetermined value.

17. The method according to claim 15, wherein in a case where both of the first external power source and the auxiliary power source are connected, the auxiliary power source is recharged from the first external power source.

18. The method according to claim 15, wherein the first external power source is an AC power source.

19. The method according to claim 15, wherein in a case where it is determined that processing based on a user instruction is to be limited based on the switch information by the second determination processing, the auxiliary power source is recharged from a second external power source after the processing based on the user instruction is limited.

20. The method according to claim 14, wherein processing based on a user instruction is printing processing based on image data.

* * * * *